(12) United States Patent
Wang

(10) Patent No.: US 11,378,982 B2
(45) Date of Patent: Jul. 5, 2022

(54) SYSTEM AND METHOD FOR LANDING A MOBILE PLATFORM VIA A MAGNETIC FIELD

(71) Applicant: SZ DJI TECHNOLOGY CO., LTD., Shenzhen (CN)

(72) Inventor: Mingxi Wang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 91 days.

(21) Appl. No.: 16/715,255

(22) Filed: Dec. 16, 2019

(65) Prior Publication Data

US 2020/0117218 A1 Apr. 16, 2020

Related U.S. Application Data

(63) Continuation of application No. 15/299,341, filed on Oct. 20, 2016, now Pat. No. 10,509,416, which is a (Continued)

(51) Int. Cl.
*B64C 25/00* (2006.01)
*G05D 1/06* (2006.01)
(Continued)

(52) U.S. Cl.
CPC ......... *G05D 1/0676* (2013.01); *B64C 25/001* (2013.01); *B64C 39/024* (2013.01); (Continued)

(58) Field of Classification Search
CPC .................................................. B64C 25/001
See application file for complete search history.

(56) References Cited

U.S. PATENT DOCUMENTS 3,745,699 A * 7/1973 Mabuchi ................ A63H 27/02
446/57
5,222,689 A * 6/1993 Simuni ............... F16C 32/0472
104/23.1
(Continued)

FOREIGN PATENT DOCUMENTS

CA         2859855 A1    2/2015
CN       201633925 U    11/2010
(Continued)

OTHER PUBLICATIONS

The World Intellectual Property Organization (WIPO) International Search Report and Written Opinion for PCT/CN2015/078102 dated Jan. 21, 2016.

*Primary Examiner* — Shelley Chen
(74) *Attorney, Agent, or Firm* — Anova Law Group, PLLC

(57) ABSTRACT

A system for landing a mobile platform, such as an Unmanned Aerial Vehicle ("UAV") and methods for making and using the same. The system can land the UAV by applying a magnetic levitation force upon the UAV and adjusting the applied magnetic levitation force. The system can initiate a landing process to a designated docking station and can guide the UAV to an adjacency of the designated docking station. Once the UAV has entered the adjacency, the magnetic levitation forces can take control of the landing process. During the landing process, certain magnetic sensitive devices installed on the UAV and/or on the designated docking station can be protected by turning them off or by shielding them. The system overcomes disadvantages of currently-available landing systems by restricting a size and weight of the landing arrangements, as well as, avoiding potential damage to the UAV and the designated docking station.

21 Claims, 6 Drawing Sheets

Related U.S. Application Data continuation of application No. PCT/CN2015/078102, filed on Apr. 30, 2015.

(51) Int. Cl.
  *G05D 1/10* (2006.01)
  *B64C 39/02* (2006.01)
  *B64F 1/02* (2006.01)
  *G01S 19/42* (2010.01)

(52) U.S. Cl.
  CPC ............... *B64F 1/02* (2013.01); *G01S 19/42* (2013.01); *G05D 1/102* (2013.01); *B64C 2201/145* (2013.01); *B64C 2201/18* (2013.01)

(56) References Cited

U.S. PATENT DOCUMENTS

| | | | | |
|---|---|---|---|---|
| 7,543,780 | B1 * | 6/2009 | Marshall | H02J 7/025 244/175 |
| 8,851,415 | B1 * | 10/2014 | Lugg | B64C 27/68 244/17.11 |
| 9,540,121 | B2 * | 1/2017 | Byers | A47G 29/14 |
| 2006/0249623 | A1 * | 11/2006 | Steele | B64F 1/04 244/116 |
| 2008/0218170 | A1 | 9/2008 | Stolarczyk et al. | |
| 2009/0045290 | A1 * | 2/2009 | Small | B64C 39/024 244/135 A |
| 2010/0291320 | A1 * | 11/2010 | Ramm | C23C 14/351 118/723 R |
| 2012/0062061 | A1 | 3/2012 | Belisle | |
| 2012/0112552 | A1 * | 5/2012 | Baarman | H02J 50/80 307/104 |
| 2012/0191274 | A1 * | 7/2012 | Gomez Perez | B64F 1/02 701/18 |
| 2013/0341462 | A1 * | 12/2013 | Jacobs | B64F 1/02 244/11 OR |
| 2015/0251561 | A1 * | 9/2015 | Konigorski | B64F 1/0299 244/1 OOR |
| 2016/0144981 | A1 * | 5/2016 | Joubert | B64F 1/22 244/50 |
| 2016/0144982 | A1 * | 5/2016 | Sugumaran | B64C 25/32 244/108 |
| 2016/0244187 | A1 * | 8/2016 | Byers | B64D 1/00 |

FOREIGN PATENT DOCUMENTS

| | | | | |
|---|---|---|---|---|
| CN | 101992856 | A | | 3/2011 |
| CN | 101992856 | A | * | 3/2011 |
| CN | 102298389 | A | | 12/2011 |
| CN | 202193207 | A | | 4/2012 |
| CN | 102749847 | A | | 10/2012 |
| CN | 103226356 | A | | 7/2013 |
| CN | 103587712 | A | | 2/2014 |
| CN | 103587712 | A | * | 2/2014 |
| CN | 104007766 | A | | 8/2014 |
| CN | 104007766 | A | * | 8/2014 |
| CN | 104443419 | A | | 3/2015 |
| CN | 104443419 | A | * | 3/2015 |
| CN | 204184579 | U | | 3/2015 |
| CN | 204184579 | U | * | 3/2015 |
| CN | 204270150 | U | * | 4/2015 |
| CN | 204297116 | U | * | 4/2015 |
| CN | 204297116 | U | | 4/2015 |
| CN | 104670515 | A | * | 6/2015 |
| CN | 104670515 | A | | 6/2015 |
| CN | 104443419 | B | | 5/2016 |
| CN | 104443419 | B | * | 5/2016 |
| CN | 103576205 | B | * | 12/2016 |
| CN | 104670515 | B | * | 11/2017 |
| GB | 2371684 | A | * | 7/2002 ............. B64C 15/14 |
| KR | 101527568 | B1 | | 6/2015 |
| KR | 101527568 | B1 | * | 6/2015 |
| RU | 2005671 | C1 | * | 1/1994 |
| WO | WO-2005072233 | A2 | * | 8/2005 ............. B64C 27/12 |
| WO | 2014075609 | A1 | | 5/2014 |

* cited by examiner

SYSTEM AND METHOD FOR LANDING A MOBILE PLATFORM VIA A MAGNETIC FIELD

CROSS-REFERENCE TO RELATED APPLICATIONS

This application is a continuation application of U.S. patent application Ser. No. 15/299,341, filed on Oct. 20, 2016, now U.S. Pat. No. 10,509,416, which is a continuation of and claims priority to PCT patent application No. PCT/CN2015/078102, filed on Apr. 30, 2015. The contents of both applications are herein incorporated by reference in their entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to mobile platform operations and more particularly, but not exclusively, to systems and methods for landing an Unmanned Aerial Vehicle ("UAV") via a controllable magnetic levitation force.

BACKGROUND

Unmanned Arial Vehicle ("UAV") technologies are becoming increasingly popular in a broad range of applications. Upon completing a functional mission and needing to be recharged or reloaded, the UAV is landed onto a designated location, such as a docking station or a ground station. Nowadays, processes of automatically operated UAVs are in great demand as the UAVs can perform more and more missions.

Due to a short history of the UAV, there are relatively few approaches available in the market for landing the UAV onto the designated docking station in supporting the automatically operated UAVs. Currently-known landing schemes are generally either traditionally reverse-triangle positioning approaches or a positioning realized based on transmission of downward views from the UAV to decide a position of a camera lens installed on the UAV.

The reverse-triangle positioning approach relies on a physical shape of the landing dock to cooperate with the UAV. A landing dock of a funnel shape is generally applied to lead the UAV to slide onto the docking station. However, because the reverse-triangle approach needs the UAV to be positioned in an area of an opening of the funnel in order for the UAV to slide in, this approach requires a small margin for landing error. Therefore, this approach requires for a landing area big enough to realize stable landing of the UAV. Furthermore, uncontrollable contacts between the funnel and the UAV may result in damage to fragile parts of the UAV.

On the other hand, the down-viewing positioning approach requires extra equipment arrangements to conduct the landing, including at least a visual element and a calculation module. To meet the requirements for landing the UAV, a high precision visual element and a high performance processing module are usually required. Generally, high precision visual elements and high performance processing modules are big and heavy, which can detriment the mounting ability of the UAV.

In view of the foregoing reasons, there is a need for systems and methods for landing an automatically operated UAV to a designated area with less restricted landing area requirements and with smaller and lighter additions for the landing.

SUMMARY

In accordance with a first embodiment disclosed herein, an exemplary method for landing an Unmanned Aerial Vehicle ("UAV") is disclosed as comprising: applying a magnetic levitation force upon the UAV; and controlling the magnetic levitation force to land the UAV.

In accordance with another embodiment disclosed herein, an exemplary UAV landing system is disclosed as being configured to automatically perform the landing process in accordance with the above-referenced exemplary method for landing the UAV.

In accordance with another embodiment disclosed herein, an exemplary computer program product is disclosed as comprising instructions for the landing the UAV in accordance with the above-referenced exemplary method for landing the UAV.

In accordance with another embodiment disclosed herein, an exemplary UAV is disclosed as comprising: a magnetic device associated with the UAV for applying a controllable magnetic levitation force; and a processor configured to control the magnetic levitation force to land the UAV.

In accordance with another embodiment disclosed herein, an exemplary docking station for landing a UAV is disclosed as comprising: a magnetic device associated with the docking station for applying a controllable magnetic levitation force; and a processor configured to control the magnetic levitation force to land the UAV.

Figure 1:
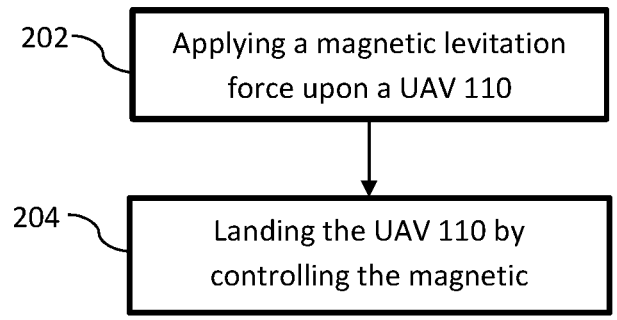
FIG. 1 an exemplary top level flow chart, illustrating an embodiment of a method for landing an Unmanned Aerial Vehicle ("UAV") via a magnetic levitation force.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available systems for landing an Unmanned Aerial Vehicle ("UAV") automatically are big, heavy, may result in damage and have limited application in landing UAVs, a UAV landing system and method that uses a magnetic field can prove desirable and provide a basis for landing UAVs. This result can be achieved, according to one embodiment disclosed in FIG. 1.

FIG. 1 illustrates an exemplary embodiment of a method 200 for landing an Unmanned Aerial Vehicle ("UAV") 110 using a magnetic levitation. As shown in FIG. 1, when landing the UAV 110, a magnetic levitation force can be applied, at 202, upon the UAV 110. The magnetic levitation force can be controllable to avoid damage to the UAV 110. In order to make it controllable, the magnetic levitation force can be desirably applied through an electromagnetic magnetic field, which will be described in additional detail below with reference to FIGS. 4-8.

At 204, the magnetic levitation force can be controlled to land the UAV 110 on a landing dock 120 of a docking station 140 (collectively shown in FIG. 2) or other predetermined location with no damage to the UAV 110. Exemplary embodiments of the method 200 for landing the UAV 110 will be discussed in additional detail with reference to FIGS. 4-8.

As described above in the background, currently-available landing approaches are either too bulky in size, too heavy or can result in damage due to, for example, hard contact between a landing gear of the UAV 110 and a docking gear of the docking station 140. With the assistance of the magnetic levitation, the method 200 disclosed herein can advantageously address the issues of the currently-available approaches. In addition, landing the UAV 110 with the magnetic levitation can be conveniently configured into an automatic landing process.

Although shown and described as using the electromagnetic field, the present disclosed embodiments can include, but are not limited, to any type of magnetic fields that are controllable, or adjustable, for controlling the magnetic levitation force.

Figure 2:
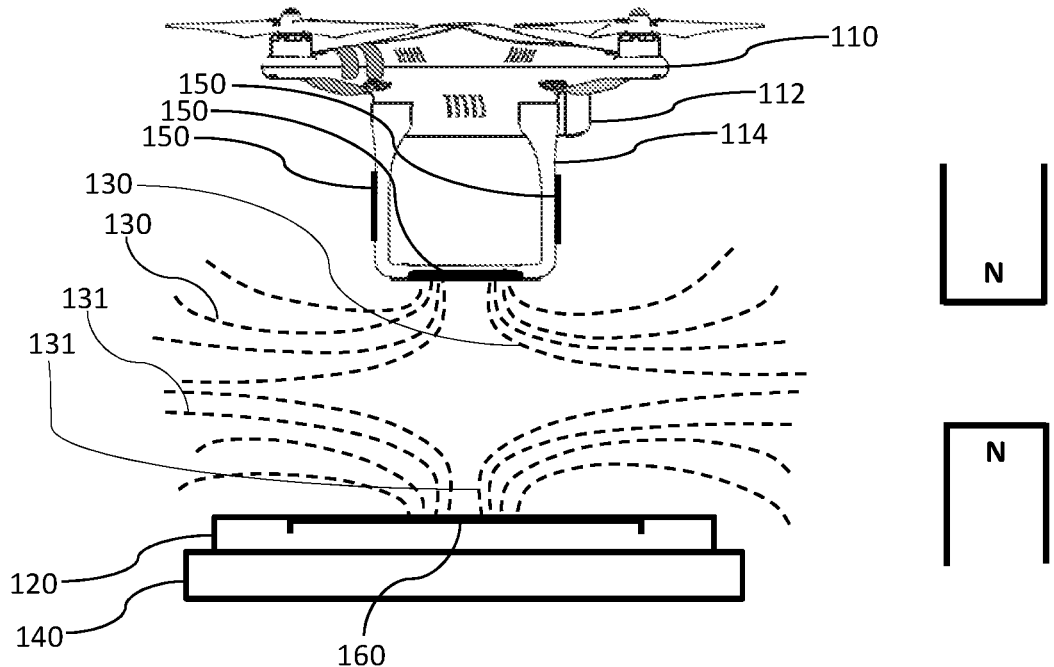
FIG. 2 is an exemplary schematic diagram, illustrating an embodiment of a landing system for implementing the method of FIG. 1, wherein the system has two interacting magnetic fields between the UAV and a docking station.

Referring to FIG. 2, an exemplary embodiment of a UAV landing system 100 to implement the method 200 of FIG. 1 is illustrated as having a docking station 140 and a cooperating UAV 110. As shown in FIG. 2, the landing system 100 can include a first magnetic arrangement 150 of the UAV 110 for emitting a first magnetic field 130 and a second magnetic arrangement 160 of the docking station 140 for emitting a second magnetic field 131 and that can cooperate with the first magnetic field 130. The first and second magnetic fields 130, 131 generated by the first and second magnetic arrangements 150, 160 can be arranged in opposing directions to controllably interact with each other to generate a magnetic levitation force (not shown) upon the UAV 110. Although shown and described as having the first and second magnetic arrangements 150, 160 for generating the first and second magnetic fields 130, 131 with reference to FIG. 2 for purposes of illustration only, the UAV landing system 100 can include three or more magnetic arrangements for generating a suitable number of magnetic fields to assist the UAV landing.

In FIG. 2, in order to generate the levitation force, the second magnetic field 131 can be generated with a predetermined pole that is the same as, and repels, a predetermined pole of the first magnetic field 130. For example, an N pole of the first magnetic field 130 can be directed toward an N pole of the second magnetic field 131, or an S pole of the first magnetic field 130 can be directed toward an S pole of the second magnetic field 131. Preferably, frequencies, magnitudes, directions and/or distributions of the first magnetic field 130 and/or the second magnetic field 131 can be controllably adjustable in order to guide the UAV 110 onto the dock 120 of the docking station 140. In some alternative embodiments, the frequencies and/or the magnitudes of the first magnetic field 130 and/or the second magnetic field 131 can be used to adjust the levitation force in upward directions, and the directions and/or the distributions can be used to provide horizontal forces to ensure the UAV 110 to land at a precise designated spot and/or in a desired orientation.

The first magnetic field 130 and/or the second magnetic field 131 can be generated with one or more permanent magnets (not shown) and/or with one or more adjustable magnets (not shown), e.g. electromagnets. Although shown and described as using permanent magnets and/or adjustable magnets with reference to FIG. 2 for purposes of illustration only, the UAV landing system 100 can generate the first and second magnetic fields 130, 131 in any suitable manner.

In FIG. 2, the first magnetic arrangement 150 can be arranged at any suitable position of the UAV 110. Exemplary positions can include, but are not limited to, a lower part of a housing 114, an outer part of the housing 114 and/or at any part of a body 112 of the UAV 110. The housing 114 and/or the magnetic arrangement 140 can be provided in any shape, size and/or any configuration. The magnetic arrangement 160 for generating the magnetic field 131 can be arranged at any suitable position of the docking station 140 and can be in any size, shape and/or configuration.

In addition, the size and shape of the first and second magnetic fields 130, 131 can depend on the first and second arrangements 150, 160 of one or more magnets (not shown) respectively associated with the UAV 110 and the docking station 140. The magnets can be configured to accommodate with a size and/or weight of the UAV 110 to be landed. The magnets can be based on other factors, including, but not limited to, levitation requirements for the landing. In some preferred embodiments, the first magnetic arraignment 150 can be configured small and light to ensure a mounting capacity of the UAV 110.

In an alternative preferred embodiment, at least one of the first and second magnetic arrangements 150, 160 can be implemented with electromagnets to generate first magnetic field 130 and/or the second magnetic field 131 as first and/or second electromagnetic fields. Use of the electromagnets advantageously enables the first and second magnetic fields 130, 131 controllable. At least one of the first and second magnetic arrangements 150, 160, for example, can include an electric coil (not shown) with a suitable shape, size and orientation for generating the first and second magnetic fields 130, 131. Electric currents and/or voltages of the electric coil can be controlled to adjust the frequencies, the magnitudes, the directions and/or the distributions of the first magnetic field 130 and/or the second magnetic field 131. Other types of adjustable magnets optionally can also be used to generate the first and/or second magnetic fields 130, 131.

Figure 3:
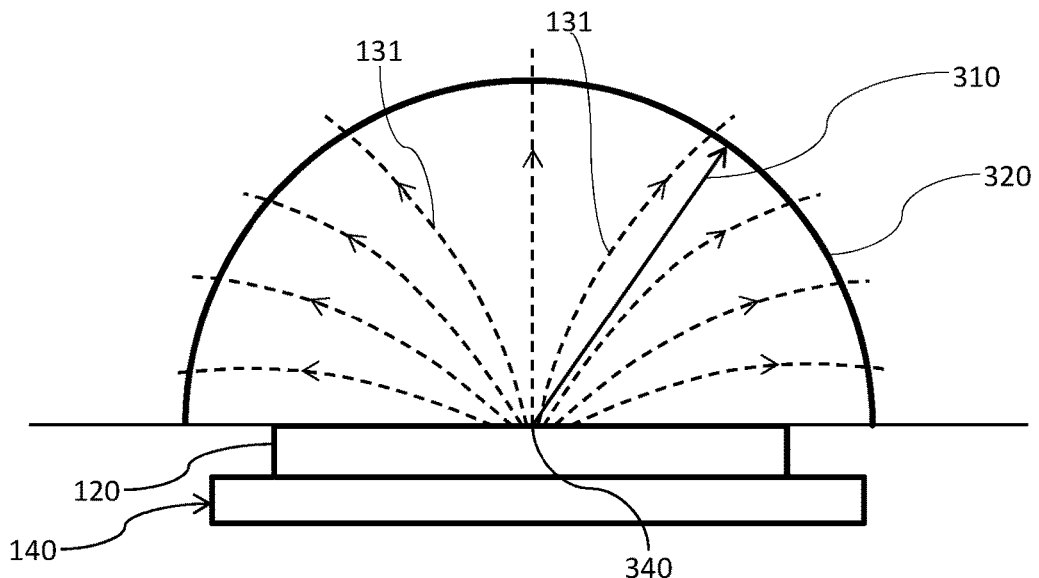
FIG. 3 is an exemplary diagram of an embodiment of the system of FIG. 2, illustrating a representative geometry of a magnetic field of the docking station for generating the magnetic levitation force of FIG. 1.

FIG. 3 shows an exemplary embodiment of the second magnetic field 131 of FIG. 2, illustrating a representative geometry of the second magnetic field 131 for generating the magnetic levitation force of FIG. 1. In FIG. 3, the second magnetic field 131 generated by the docking station 140 (shown in FIG. 2) is illustrated as having a half sphere boundary 320 axially aligned with the docking station 140. The half sphere boundary 320 can have a radius 310 for defining an effective range of the second magnetic field 131. The radius 310 can establish a boundary for the magnetic levitation force for controlling the landing of the UAV 110 (shown in FIG. 2). In another exemplary embodiment, the radius 310 can be greater than one meter and less than five meters.

Although shown and described as having a half sphere boundary 320 with a radius 310 for purposes of illustration only, the effective range of the magnetic field 131 can be provided in any other predetermined shapes, including, but not limited to, circular sections, elliptical sections and/or rectangles. In other alternative exemplary embodiments, the effective range of the second magnetic field 131 can be a directional shape, e.g. a directional circular section or a directional elliptical section.

Figure 4:
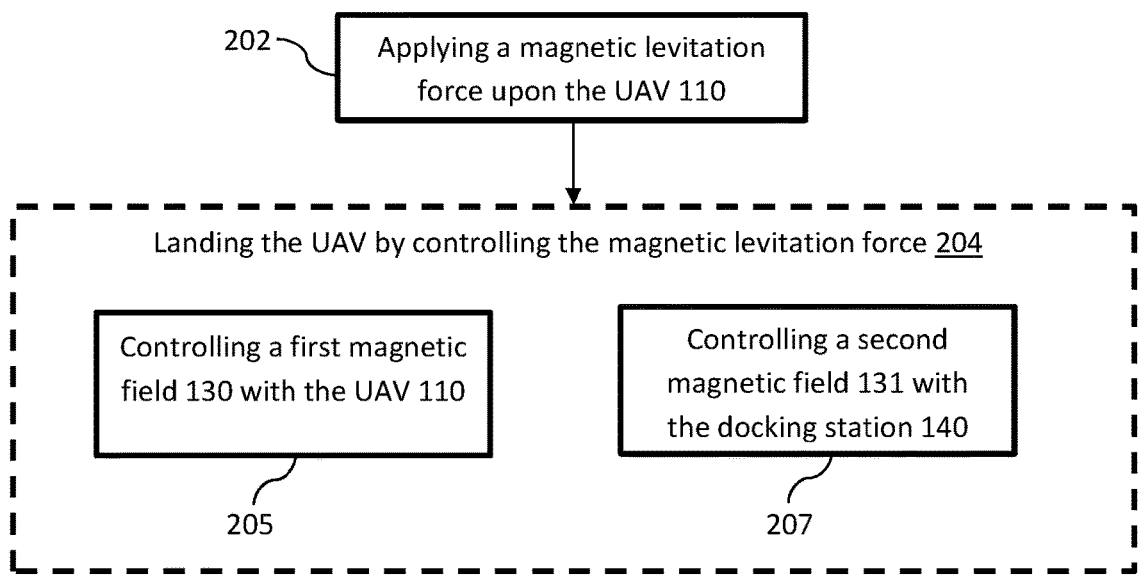
FIG. 4 is an exemplary block diagram, illustrating an alternative embodiment of the method of FIG. 1, wherein landing the UAV includes controlling at least one of the interacting magnetic fields.

FIG. 4 illustrates an alternative embodiment of the method 100 of FIG. 1, wherein landing the UAV 110, at 204, can be achieved by controlling at least one of the first magnetic field 130 and second magnetic fields 131. As shown and described with reference to FIG. 2, the UAV 110 and the docking station 140 can configure the first and second magnetic fields 130, 131, respectively. In order to control the magnetic levitation force applied upon the UAV 110, at least one of the first and second magnetic fields 130, 131 can be configured to be controllable, at 205, 207. The first magnetic field 130 and/or the second magnetic field 131, for example, can be controllable if provided as an adjustable magnetic field in the manner discussed in more detail above with reference to FIG. 2.

At 205, the first magnetic field 130 emitted by the UAV 110 can be configured to be controllable (and/or adjustable). The UAV landing process thereby can be performed by controlling, at 205, the first magnetic field 130. When the first magnetic field 130 is controllable, the second magnetic field 131 can be a permanent magnetic field and/or an adjustable magnetic field.

At 207, the second magnetic field 131 emitted by the docking station 140 can be configured to be controllable (and/or adjustable). The UAV landing process thereby can be performed by controlling the second magnetic field 131. When the second magnetic field 131 is controllable, and the first magnetic field 130 can be a permanent magnetic field and/or a controllable magnetic field. Additional detail regarding controlling the UAV landing process will be shown and described below with reference to FIGS. 6-8.

Although shown and described as being the first and second magnetic fields 130, 131 in FIG. 4 for purposes of illustration only, the first and second magnetic fields 130, 131 can be implemented with any number of magnetic fields.

Figure 5:
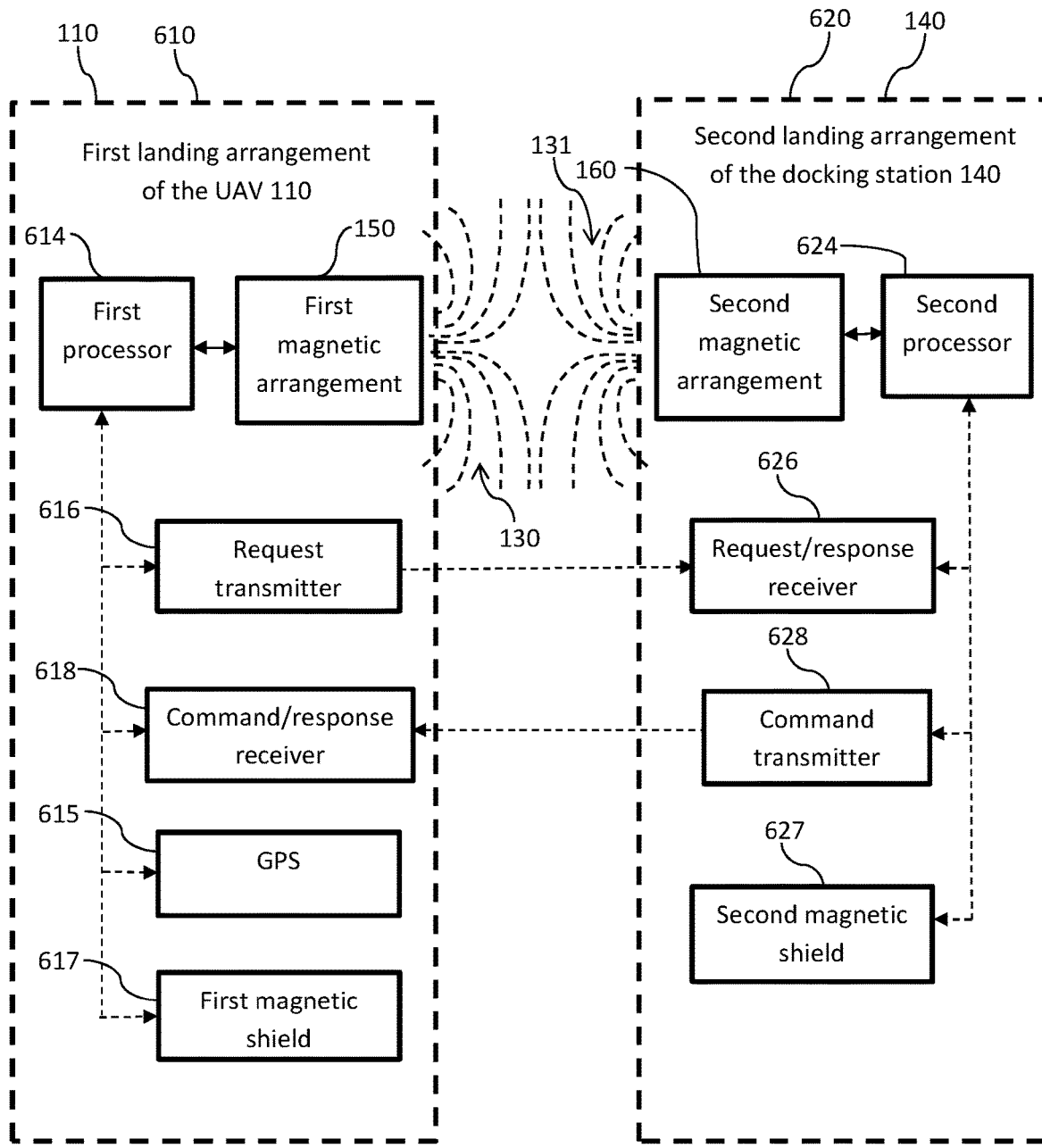
FIG. 5 is an exemplary block diagram, illustrating alternative embodiment of the system of FIG. 2, wherein the system includes first and second landing arrangements.

Referring now to FIG. 5, exemplary configuration embodiments of the UAV landing system 100 of FIG. 2 is further illustrated with exemplary components to perform a UAV landing process. As shown in FIG. 5, the exemplary embodiments of the UAV landing system 100 can include a first landing arrangement with the UAV 110, at 610, and a second landing arrangement with the docking station 140, at 620.

The first landing arrangement 610 can have the first magnetic arrangement 150 for generating the first magnetic field 130, as shown in FIG. 2. Optionally, the first magnetic field 130 can be generated by running an electric current through a conductor in a predetermined direction. The conductor, for example, can be a metallic sheet, a magnetic material sheet and/or an electrical coil conductor with electric current running through flowing in a certain direction to generate an electromagnetic field. The first magnetic arrangement 150 of the UAV 110 can be configured to create the first magnetic field 130 as a directional magnetic field. The electric current running through the conductor can be adjustable for controlling the first magnetic field 130.

As shown in FIG. 5, the first landing arrangement 610 can also have a first processor 614 for controlling the UAV landing process. The first processor 614 can be a dedicated processor solely configured to control the landing process. Additionally and/or alternatively, the first processor 614 optionally can be a shared processor configured to perform other functions in addition to the landing process. Exemplary other functions include, but are not limited to, controlling operations of the UAV 110, controlling devices installed on the UAV, e.g. image cameras, video camera and dusters, and processing captured images etc. The first processor 614 preferably can send a landing request via a request transmitter 616 to a remote device, e.g. a designated docking station 140, and can initiate the landing process. The landing process can be initiated with or without a receipt of a response to the landing request. As shown in FIG. 5, the landing request can be sent to the designated docking station 140 and the response to the landing request can be sent from the remote device, e.g. the designated docking station 140, via a command/response receiver 618.

In some other embodiments, the command/response receiver 618 can receive a landing command. The command/response receiver 618 can provide the landing command to the first processor 614, which can initiate and/or control the landing process. The landing process will be shown and described in additional detail below with reference to FIGS. 6-8. Although shown and described as being separate components with reference to FIG. 5 for purposes of illustration only, the request transmitter 616 and/or the command/response receiver 618 can be a combined component and/or be at least partially integrated with the first processor 614 or other components of the UAV 110.

Although shown and described as being a processor installed on the UAV 110 with reference to FIG. 5 for purposes of illustration only, the first processor 614 can be a remote processor (not shown) controlling the landing process through any wireless means as shown and described in additional detail below with reference to FIGS. 6-8.

The first landing arrangement 610 for the automatic landing system 100 can comprise other devices for guiding the UAV 110 to an effective range for the magnetic levitation force take control of the landing process, i.e. an adjacency of the docking station 140. The adjacency of the docking station 140 refers to a spatial region adjacent to the docking station 140. An exemplary adjacency can be a half sphere defined by the half sphere boundary 320 shown and described with reference to FIG. 3. In FIG. 5, a global positioning system (or GPS) 615 can be provided for guiding the UAV 110 to the adjacency.

The GPS 615 is a space-based satellite navigation system that can provide location, altitude and/or time information anywhere on or near the earth where there is an unobstructed line of sight to four or more GPS satellites. The GPS 615 can comprise any commercially available GPS devices. The GPS 615 can connect to the first processor 614 via a wired and/or wireless connection and can provide location and/or altitude information of the UAV 110 to the first processor 614. The GPS 615 can also provide location information of the designated docking station 140 to the first processor 614, which can control the UAV 110 to fly to toward the adjacency of the designated docking station 140. When the UAV 110 enters the adjacency of the designated docking station 140, the GPS 615 can be protected by deactivating, i.e. switching off the power to, the GPS 615 or by one or more magnetic shields that will be described below. In case of being protected by deactivation, the status data of the GPS 615 can be preserved while the GPS 615 is deactivated. The status data can be restored when the GPS 615 is reactivated when the landing process completes.

Although shown and described as using the GPS 615 for providing the location and altitude information for purposes of illustration only, other suitable forms of devices can be applied for providing such information, including, but not limited to, compasses and preloaded maps etc.

The first landing arrangement 610 can provide an arrangement for protecting magnetic sensitive devices associated with the UAV 110, including not limited to, High-Definition image transferring devices, compasses and electrical circuits. Additional detail regarding the sensitive devices will be shown and described below with reference to FIG. 8. In FIG. 5, a first magnetic shield 617 can be provided for protecting the sensitive devices. The first magnetic shield 617 can be made of any metallic or magnetic material that can protect the magnetic sensitive devices covered by the first magnetic shield 617 from environmental magnetic fields. In an alternative embodiment, the first magnetic shield 617 can attenuate the first magnetic field 130 and the second magnetic field 131, but not attenuate an earth magnetic field. The first magnetic shield 617 can be associated with the first processor 614, which can control activating (or shielding) and deactivating (or exposure without shielding) of the first magnetic shield 617.

Although shown and described as using a cover as one first magnetic shield 617 for purposes of illustration only, any suitable number of magnetic shields can be provided for protecting the magnetic sensitive devices. In a preferred embodiment, one or more first magnetic shields 617 can be associated with the UAV 110 for protecting the magnetic sensitive devices.

FIG. 5 also shows that the UAV landing system 100 can include the second landing arrangement with the docking station 140, at 620. The second landing arrangement 620 can have a second magnetic arrangement 160 for generating the second magnetic field 131, which is shown and described in additional detail above with reference to FIGS. 2 and 3. Optionally, the second magnetic field 131, as shown in FIG. 2, can be generated by running an electric current through a conductor in a predetermined direction. The conductor, for example, can be a metallic sheet, a magnetic material sheet and/or an electrical coil conductor with electric current running through flowing in a certain direction to generate an electromagnetic field. The second magnetic arrangement at 160 can be configured to create the second magnetic field 131 as a directional magnetic field. The electric current running through the conductor can be adjustable for controlling the second magnetic field 131.

As shown in FIG. 5, the second landing arrangement 620 can have a second processor 624 for controlling the UAV landing process. The second processor can be a dedicated processor solely configured to control the landing process. Additionally and/or alternatively, the second processor 624 can be a shared processor configured to perform other functions in addition to the landing process, e.g. operations of the docking station 140. The second processor 624 can initiate a landing process by issuing a landing command to the UAV 110 via a command transmitter 628. The processor can also receive a landing request from the UAV 110 via a request/response receiver 626 and can send a response to the landing request.

Although shown and described as being separate components with reference to FIG. 5 for purposes of illustration only, the request/response receiver 626 and/or the command transmitter 628 can be a combined component or be at least partially integrated with the second processor 624 or any other components of the docking station 140.

The second landing arrangement 620 can also provide an arrangement for protecting magnetic sensitive devices associated with the docking station 140. Additional detail regarding the sensitive devices will be shown and described below with reference to FIG. 8. In FIG. 5, a second magnetic shield 627 can be provided for protecting the sensitive devices. The second magnetic shield 627 can be provided in the same manner as the first magnetic shield 617. The second magnetic shield 627 can be associated with the second processor 624, which can control activating (or shielding) and deactivating (or exposure without shielding) of the second magnetic shield 627. In a preferred embodiment, similar to the first magnetic shield 617, one or more second magnetic shields 627 can be associated with the docking station 140 for protecting the magnetic sensitive devices.

Figure 6:
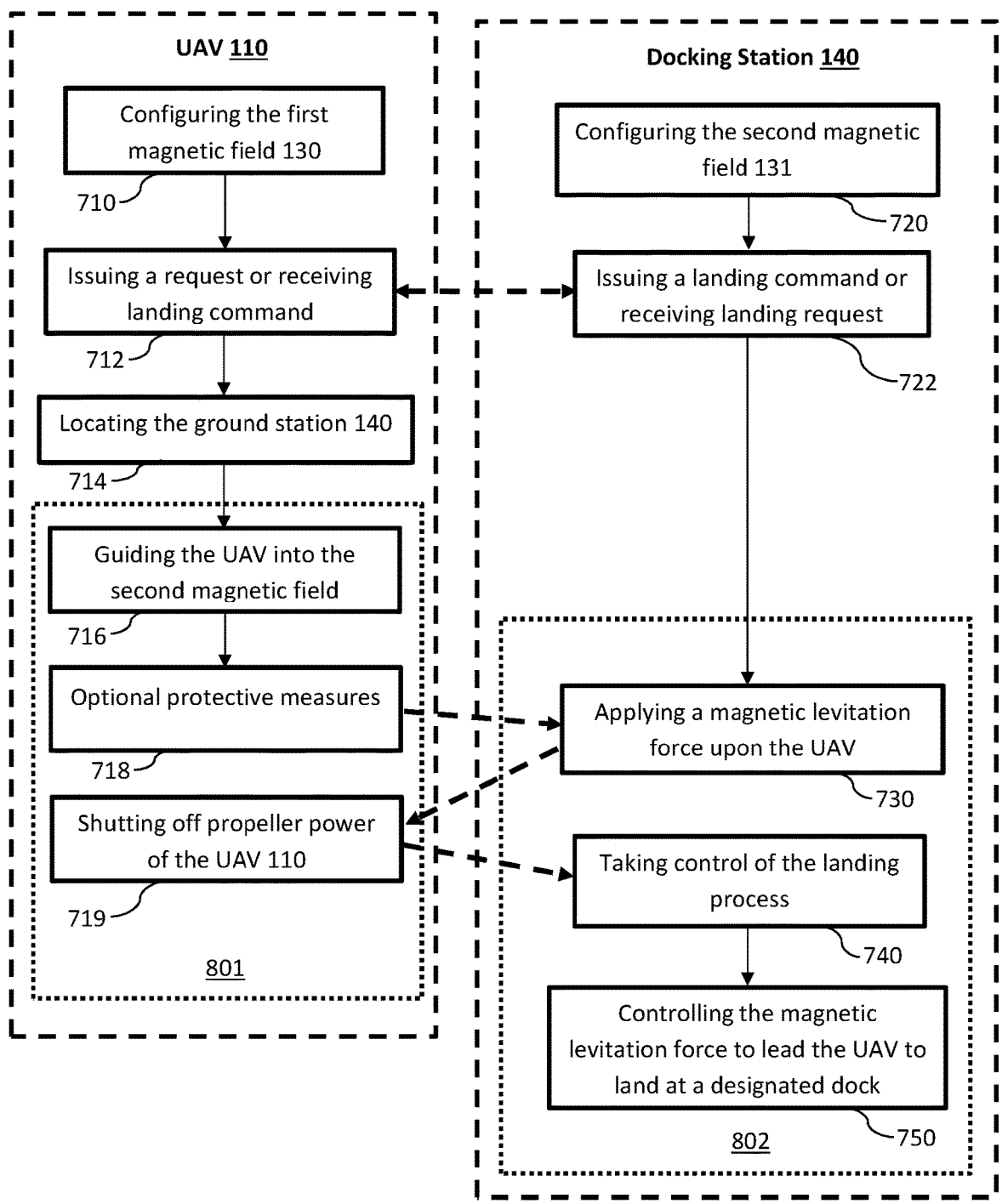
FIG. 6 is an exemplary flowchart, illustrating still another alternative embodiment of the method of FIG. 1, wherein at least one of the first and second landing arrangements of FIG. 5 emits a magnetic field.

FIG. 6 shows an exemplary embodiment of the UAV landing method 200, wherein the first magnetic arrangement 150 and/or the second magnetic arrangement 160 can be configured to emit adjustable magnetic fields, e.g. electromagnetic fields, for controlling the landing the UAV 110. At 710, the first magnetic field 130 can be configured with the UAV 110 in the manner shown and described in more detail above with reference to FIGS. 2-5. In an exemplary embodiment, the first magnetic field 130 can be emitted when a first condition is satisfied, e.g. before and/or after the UAV 110 is guided, at 716, into the adjacency of the docking station 140.

The landing process can be initiated by the first processor 614 of the UAV 110, at 712. The first processor 614 of the UAV 110 can issue a request to land on the docking station 140 (shown in FIGS. 2 and 3) upon completion of an unmanned flight mission, e.g. a videoing mission, an imaging mission and/or a dusting mission. Additionally and/or alternatively, the first processor 614 of the UAV 110 can receive a landing command from a designated docking station 140 or any other remote devices (not shown). The other remote devices include, but are not limited to, a centralized control station, a smartphone and any devices that can run command applications.

When the UAV 110 issues the landing request, the landing process preferably is started immediately or started at a receipt of a response from the designated docking station 140 or any other remote devices. In a preferred embodiment, the landing process can start immediately upon issuing the landing request and without waiting for a response when the UAV 110 knows which docking station 140 is designated for the landing. Additionally and/or alternatively, when a docking station 140 has not been designated, the UAV 110 can wait for a response from the designated docking station 140 before initiating the landing process. Upon receiving the landing command, the UAV 110 can immediately start the landing process with or without sending a response to the designated docking station 140 and/or the remote device.

At 714, the UAV 110 can locate the designated docking station 140. The UAV 110, for example, can use an internal navigation device (not shown) and/or an external navigation device (not shown) to locate the designated docking station 140. The internal navigation device can be a GPS 615 or be any other types of positioning, tracking and/or navigating devices or systems. The internal navigation device can work with a satellite signal, a navigation map and/or a traceable single being issued from the designated docking station 140.

The external navigation device can be the GPS 615 (shown in FIG. 5) or be any other types of positioning, tracking and/or navigating devices or systems associated with the designated docking station 140 or with any other remote devices. The external navigation device can be configured to communicate with the UAV 110 through any form of wireless communication to transfer location information of the designated docking station 140. The forms of wireless communications can include but not limited to Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT).

The internal and/or external navigation device, such as the GPS 615, can guide the UAV 110 toward a docking area defined by the magnetic field boundary 320 of the designated docking station 140 (collectively shown in FIG. 3), at 716. The magnetic field boundary 320 can define a boundary that a levitation force of the UAV 110 can be switched from propellers of the UAV 110 to a levitation force generated as a result of an interaction between the first and second magnetic fields 130, 131. At 716, the UAV 110 can be guided with the external navigation device remotely in a manner similar to the manner by which the UAV 110 can locate, at 714, the designated docking station 140 as described above.

In an alternative embodiment, visual positioning can be provided as a preparation step for activating the magnetic levitation force. In such cases, the UAV 110 can be guided close to the adjacency of the designated docking station 140 by the navigation device, and a visual positioning device (not shown) can guide the UAV 110 further into the adjacency of the designated docking station 140. The UAV 110 can determine a direction and a precise spot of the designated docking station with the visual positioning device. Such visual positioning device can include an imaging device (now shown), which can depend on a visual mark on the dock 160 (shown in FIG. 2) of the designated docking station to determine the direction and the precise spot of the designated docking station 140.

Figure 8:
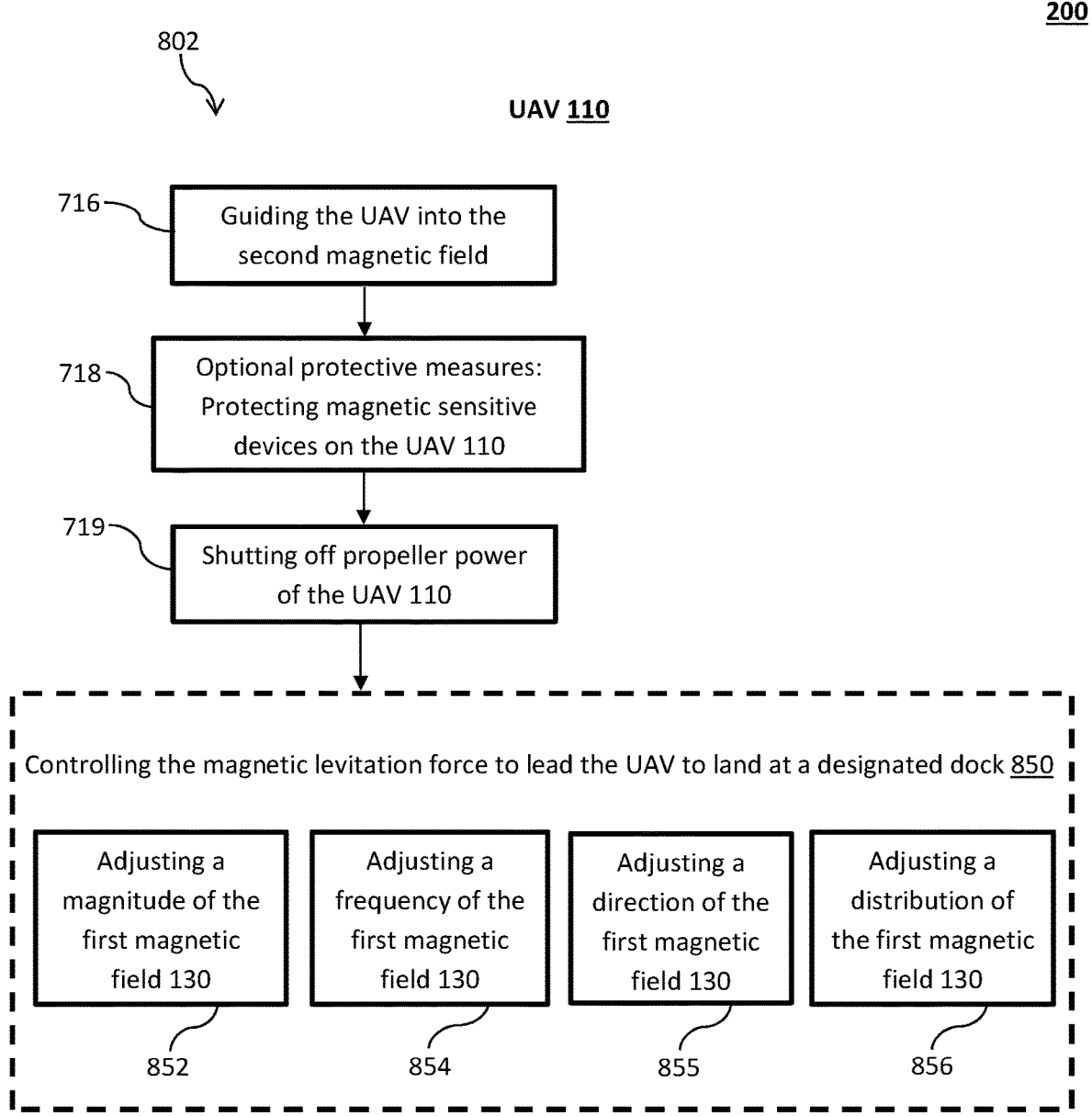
FIG. 8 is an exemplary flowchart, illustrating another alternative embodiment of the method of FIG. 6, wherein the method includes a control process for the magnetic levitation force via the UAV.

Optionally, the method 200 can execute certain protective measures at 718, which will be shown and described in additional detail with reference to FIG. 8. The steps 716, 718 and 719 of the landing process will be described in additional detail with reference to FIG. 8.

At 720, the second magnetic field 131 can be configured with the docking station 140 in the manner shown and described in more detail above with reference to FIGS. 2-5. The docking station 140 can be configured to emit the second magnetic field 131 before and/or after the UAV 110 issues the landing request and/or receives the landing command at 712. In some exemplary embodiments, the second magnetic field 131 can be emitted when a second condition is satisfied, e.g. before and/or after the UAV 110 is guided, at 716, into the adjacency of the docking station 140. As illustrated and described above with reference to FIGS. 2, 3 and 5, the second magnetic field 131 can be preferably controllable, including initiating the second magnetic field 131 and/or adjusting a frequency, a magnitude, directions and/or a distribution of the second magnetic field 131. The frequency, the magnitude, the direction and/or the distribution of the second magnetic field 131 can be controlled in accordance with needs of the landing process.

As an alternative embodiment, at 722, the docking station can be configured to initiate a landing process by issuing a landing command to the UAV 110 and/or receiving a landing request from the UAV 110. In addition, the docking station 140 can transmit precise location information for landing the UAV 110 along with the landing command.

When the UAV 110 enters into an effective range defined by the boundary 320 (shown in FIG. 2) of the magnetic field 131, the UAV 110 can shut down power of the UAV 110, including, but not limited to, the power to propellers of the UAV 110, at 719. Although shown and described as separately performing, taking the optional protective measures, at 718, and shutting down UAV power, at 719, can be at least partially combined and/or performed in any time spot relative to the applying the magnetic levitation force at 730.

Although shown and described as being performed in an order of 716, 718, 730, 719 and 740 with reference to FIG. 6 for illustrative purposes only, the steps 716, 718, 730, 719 and 740 can be performed in any order during the landing process.

At 750, the UAV 110 can be controlled under the magnetic levitation force and can be lead to the designated docking station 140. The steps 730, 740, 750 will be described in additional detail with reference to FIG. 7.

Figure 7:
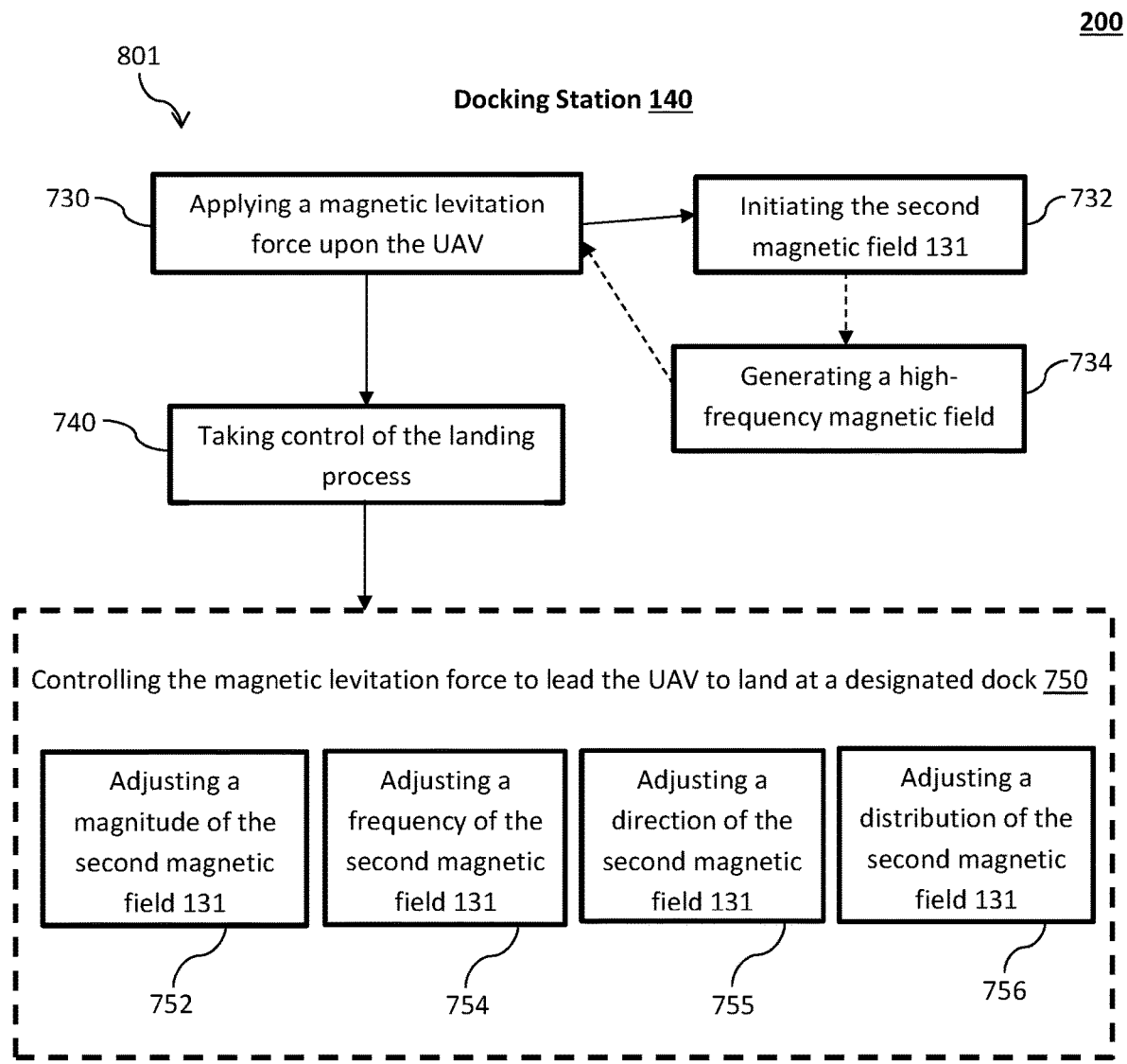
FIG. 7 is an exemplary flowchart, illustrating an alternative embodiment of the method of FIG. 6, wherein the method includes a control process for the magnetic levitation force via the docking station.

Turning now to FIG. 7, an alternative embodiment of the method 200 of FIG. 6 is shown. FIG. 7 shows an exemplary manner of landing the UAV 110 with a magnetic levitation force controlled by the docking station 140 by applying the magnetic levitation force at 730 and controlling the magnetic levitation force to land the UAV 110, at 750.

In FIG. 7, at 730, when applying the magnetic levitation force upon the UAV 110, the second magnetic field 131 can be initiated and the first magnetic field 130 can be initiated before and/or after the second magnetic field 131, at 732. When the second magnetic field 131 comes in effect, the second magnetic field 131 interacts with the first magnetic field 130 in the manner described in detail above with reference to FIG. 2. In order to maintain a stabilized magnetic levitation force against the UAV 110, the second magnetic field 131 can be generated as a high-frequency magnetic field, e.g. a high-frequency electromagnetic field, at 734. The high-frequency magnetic field generated, at 734, can have an initial frequency. In one embodiment, the initial frequency can be greater than three megahertz (3 MHz) and less than thirty megahertz (30 MHz).

Although shown and described as high-frequency magnetic field with reference to FIG. 7 for purposes of illustration only, the second magnetic field 131 can be generated with any initial frequency, including, but not limited to, very-high-frequency, ultra-high-frequency, super-high-frequency and any other frequencies above high-frequency. The very-high frequency can be greater than thirty megahertz (30 MHz) and less than three hundred megahertz (300 MHz). The ultra-high-frequency can be greater than three hundred megahertz (300 MHz) and less than three gigahertz (3 GHz). The super-high-frequency can be greater than three gigahertz (3 GHz) and less than thirty gigahertz (30 GHz).

Upon taking control of the landing process by the docking station 140, at 740, the UAV 110 can be lead to land at the designated docking station 140, at 750. The controlling the magnetic levitation force can include, but are not limited to, adjusting a magnitude of the second magnetic field 131 at 752, adjusting a frequency of the second magnetic field 131 at 754, adjusting a direction of the second magnetic field 131 at 755 and/or adjusting a distribution of the second magnetic field 131 at 756. Optionally, the controlling the magnetic levitation force can also include adjusting a magnitude, a frequency, a direction and/or a distribution of the first magnetic field 130 remotely by the docking station 140.

Turning now to FIG. 8, another alternative embodiment of the method 200 of FIG. 6 is shown. FIG. 8 shows an exemplary manner of landing the UAV 110 with a magnetic levitation force controlled by the UAV 110 to land the UAV at 850.

In FIG. 8, the first magnetic field 130 can be used to control the magnetic levitation force for leading the UAV 110 to land at a designated docking station. In order to maintain a stabilized magnetic levitation force against the UAV 110, the first magnetic field 130 can be generated as a high-frequency electromagnetic field, e.g. a high-frequency electromagnetic field. The high-frequency magnetic field can have an initial frequency. In one embodiment, the initial frequency can be greater than three megahertz (3 MHz) and less than thirty hertz (30 MHz).

The frequencies of the first magnetic field 130 can be in the manner discussed above regarding the second magnetic field 131.

In order to protect selected magnetic sensitive devices installed on the UAV 110, at 718, the optional protective measures of FIG. 6 are shown as protecting magnetic sensitive devices on the UAV 110. The protective measures can be taken before, at or after initiating the first magnetic field 130 or before, at or after entering the second magnetic field 131. The protective measures can include, but are not limited to, switching off power to the selected devices and/or shielding those devices with the first magnetic shield 617 as shown and described with reference to FIG. 5. The magnetic sensitive devices of the UAV 110 can include, but are not limited to, high-definition transmitting devices, a compass and certain electrical circuits, such as application-specific integrated circuits. For some of the magnetic sensitive devices, such as the compass, status or data before being protected can be preserved. The status or data of such devices can be restored when the protection is released at completion of the landing process.

Certain sensitive devices installed on the docking station 140 can be also protected (not shown) on or before emitting the second magnetic field 131. Such sensitive devices can include, but are not limited to, certain electrical circuits, such as application-specific integrated circuits. The protection of such devices can be provided in the same manner as shown and described for the magnetic devices installed on the UAV 110.

Upon taking control of the landing process by the UAV 110 (not shown), the UAV 110 can be lead to land at the designated docking station 140, at 850. The controlling the magnetic levitation force can include, but are not limited to, adjusting a magnitude of the first magnetic field 130 at 852, adjusting a frequency of the first magnetic field 130 at 854, adjusting a direction of the first magnetic field 130 at 855 and/or adjusting a distribution of the first magnetic field 130 at 856. Optionally, the controlling the magnetic levitation force can also include adjusting a magnitude, a frequency, a direction and/or a distribution of the second magnetic field 131 remotely by the UAV 110.

In additional and/or alternative embodiments, the adjusting of the first and/or second magnetic fields 130, 131 include gradually reducing or increasing the magnitude and/or the frequencies of the first and second magnetic fields 130, 131, and/or gradually changing the directions and/or the distributions of the first and second magnetic fields 130, 131.

When the UAV 110 lands on the docking station 140 under the magnetic levitation force, any or both of the first and second magnetic fields 130, 131 can be switched off (not shown). The landing process of the UAV 110 terminates, i.e. the UAV 110 is landed on the precise spot of the docking station 140.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

In accordance with a first aspect disclosed herein, there is set forth a method for landing an Unmanned Aerial Vehicle ("UAV"), comprising: applying a magnetic levitation force upon the UAV; and controlling the magnetic levitation force to land the UAV.

In an exemplary embodiment of the disclosed methods, controlling the magnetic levitation force comprises landing the UAV at a designated docking station.

In an exemplary embodiment of the disclosed methods, applying the magnetic levitation force comprises emitting a first magnetic field from the UAV for opposing a second magnetic field to generate the magnetic levitation force upon the UAV.

In another exemplary embodiment of the disclosed methods, emitting the first magnetic field comprises emitting a first electromagnetic field from the UAV.

In another exemplary embodiment of the disclosed methods, emitting the first electromagnetic field comprises emitting a high-frequency electromagnetic field from the UAV.

In another exemplary embodiment of the disclosed methods, controlling the magnetic levitation force comprises adjusting at least one of a frequency, a magnitude, a direction and a distribution of the first electromagnetic field to land the UAV in an orientation and at a precise spot of a designated docking station.

In another exemplary embodiment of the disclosed methods, emitting the first magnetic field comprises emitting the first magnetic field by running an electric current through an electrical conductor and/or activating a magnetic device associated with the UAV.

Exemplary embodiments of the disclosed methods further comprise emitting the second magnetic field from the designated docking station for opposing the first magnetic field.

In another exemplary embodiment of the disclosed methods, emitting the second magnetic field comprises emitting a second electromagnetic field.

In another exemplary embodiment of the disclosed methods, emitting the second electromagnetic field comprises emitting a high-frequency electromagnetic field from the designated docking station.

In another exemplary embodiment of the disclosed methods, controlling the magnetic levitation force comprises adjusting at least one of a frequency, a magnitude, a direction and a distribution of the second electromagnetic field to land the UAV in an orientation and at a precise spot of the designated docking station.

In another exemplary embodiment of the disclosed methods, emitting the second magnetic field comprises running an electric current through an electrical conductor and/or activating a magnetic device associated with the designated docking station.

Exemplary embodiments of the disclosed methods further comprise controlling the landing of the UAV via the first magnetic field.

Exemplary embodiments of the disclosed methods further comprise controlling the landing of the UAV via the second magnetic field.

Exemplary embodiments of the disclosed methods further comprise issuing a landing request from the UAV and/or receiving a landing command from a docking station.

Exemplary embodiments of the disclosed methods further comprise emitting a position signal from the docking station and/or presenting a visual sign at the designated docking station.

Exemplary embodiments of the disclosed methods further comprise locating the designated docking station with a Global Positioning System ("GPS").

Exemplary embodiments of the disclosed methods further comprise guiding the UAV toward an adjacency of the designated docking station via the GPS.

Exemplary embodiments of the disclosed methods further comprise guiding the UAV toward an adjacency of the designated docking station via the GPS and guiding the UAV into the adjacency via visual positioning.

In another exemplary embodiment of the disclosed methods, the adjacency comprises a respective height and a respective position relative to the designated docking station.

In another exemplary embodiment of the disclosed methods, the adjacency comprises a half-sphere axially aligned with the designated docking station.

In another exemplary embodiment of the disclosed methods, the half-sphere has a radius that is greater than one meter and less than five meters.

In another exemplary embodiment of the disclosed methods, emitting the first magnetic field comprises emitting the first magnetic field when the UAV enters the adjacency of the designated docking station.

In another exemplary embodiment of the disclosed methods, emitting the second magnetic field comprises emitting the second magnetic field when the UAV enters the adjacency of the designated docking station.

Exemplary embodiments of the disclosed systems further comprise protecting magnetic sensitive devices of the UAV while the first magnetic field is activated.

Exemplary embodiments of the disclosed systems further comprise protecting magnetic sensitive devices of the docking station while the second magnetic field is activated.

In another exemplary embodiment of the disclosed methods, protecting the magnetic sensitive devices comprises deactivating the magnetic sensitive devices and/or shielding the magnetic sensitive devices with one or more magnetic shields.

In another exemplary embodiment of the disclosed methods, the one or more magnetic shields attenuate the first magnetic field and/or the second magnetic field.

In another exemplary embodiment of the disclosed methods, the one or more magnetic shields do not attenuate an earth magnetic field.

In another exemplary embodiment of the disclosed methods, the magnetic sensitive devices comprise at least one of High-Definition image transferring devices, compasses and electrical circuits.

Exemplary embodiments of the disclosed systems further comprise deactivating the first magnetic field when the UAV is landed at the precise spot of the designated docking station.

Exemplary embodiments of the disclosed systems further comprise deactivating the second magnetic field when the UAV is landed at the precise spot of the designated docking station.

In accordance with another aspect disclosed herein, there is set forth a UAV landing system configured to automatically perform the landing process in accordance with any one of previous embodiments of the disclosed methods.

In accordance with another aspect disclosed herein, there is set forth a computer program product comprising instructions for the landing the UAV in accordance with any one of previous embodiments of the disclosed methods.

In accordance with another aspect disclosed herein, there is set forth an Unmanned Aerial Vehicle ("UAV"), comprising: a magnetic device associated with the UAV for applying a controllable magnetic levitation force; and a processor configured to control the magnetic levitation force to land the UAV.

In an exemplary embodiment of the disclosed UAVs, the controllable magnetic levitation force is controlled by the processor via the magnetic device.

In an exemplary embodiment of the disclosed UAVs, the controllable magnetic levitation force is generated by a first magnetic field emitted from the magnetic device and a second magnetic field, and wherein the second magnetic field opposes the first magnetic field for generating the magnetic levitation force upon the UAV.

In an exemplary embodiment of the disclosed UAVs, the first magnetic field is a first electromagnetic field.

In another exemplary embodiment of the disclosed UAVs, the first electromagnetic field is a high-frequency electromagnetic field.

In another exemplary embodiment of the disclosed UAVs, the first electromagnetic field is controlled by the magnetic device via adjusting at least one of a frequency, a magnitude, a direction and a distribution of the first electromagnetic field to land the UAV in an orientation and at a precise spot of a designated docking station.

In another exemplary embodiment of the disclosed UAVs, the first magnetic field is emitted from the magnetic device by running an electric current through an electrical conductor.

In another exemplary embodiment of the disclosed UAVs, the processor is configured to control the landing of the UAV via the first magnetic field.

In another exemplary embodiment of the disclosed UAVs, the processor is configured to issue a landing request and/or to receive a landing command from a docking station.

Exemplary embodiments of the disclosed UAVs further comprise a Global Positioning System ("GPS") for locating a designated docking station.

In another exemplary embodiment of the disclosed UAVs, the processor is configured to guide the UAV based on guiding information of the GPS toward an adjacency of the designated docking station.

Exemplary embodiments of the disclosed UAVs further comprise a visual device associated with the UAV for guiding the UAV into the adjacency via visual positioning.

In another exemplary embodiment of the disclosed UAVs, the adjacency comprises a respective height and a respective position relative to the designated docking station.

In another exemplary embodiment of the disclosed UAVs, the adjacency comprises a half-sphere axially aligned with the designated docking station.

In another exemplary embodiment of the disclosed UAVs, the half-sphere has a radius that is greater than one meter and less than five meters.

In another exemplary embodiment of the disclosed UAVs, the first magnetic field is emitted when the UAV enters the adjacency of the designated docking station.

Exemplary embodiments of the disclosed UAVs further comprise one or more magnetic shields configured to protect magnetic sensitive devices associated with the UAV while the first magnetic field is activated.

In another exemplary embodiment of the disclosed UAVs, the protection of magnetic sensitive devices includes deactivating the magnetic sensitive devices and/or shielding the magnetic sensitive devices with the one or more magnetic shields.

In another exemplary embodiment of the disclosed UAVs, the one or more magnetic shields attenuate the first magnetic field and/or the second magnetic field.

In another exemplary embodiment of the disclosed UAVs, the one or more magnetic shields do not attenuate an earth magnetic field.

In another exemplary embodiment of the disclosed UAVs, the magnetic sensitive devices comprise at least one of High-Definition image transferring devices, compasses and electrical circuits.

In another exemplary embodiment of the disclosed UAVs, the processor is configured to deactivate the first magnetic field when the UAV is landed at the precise spot of the designated docking station.

In accordance with another aspect disclosed herein, there is set forth a docking station for landing a UAV, comprising: a magnetic device associated with the docking station for applying a controllable magnetic levitation force; and a processor configured to control the magnetic levitation force to land the UAV.

In an exemplary embodiment of the disclosed docking stations, the controllable magnetic levitation force is controlled by the processor via the magnetic device.

In an exemplary embodiment of the disclosed docking stations, the controllable magnetic levitation force is generated by a second magnetic field emitted from the magnetic device and a first magnetic field, and wherein the first magnetic field opposes the second magnetic field for generating the magnetic levitation force upon the UAV.

In an exemplary embodiment of the disclosed docking stations, the first magnetic field is emitted from the UAV.

In an exemplary embodiment of the disclosed docking stations, the second magnetic field is a second electromagnetic field.

In an exemplary embodiment of the disclosed docking stations, the second electromagnetic field is a high-frequency electromagnetic field.

In an exemplary embodiment of the disclosed docking stations, the second electromagnetic field is controlled by the magnetic device via adjusting at least one of a frequency, a magnitude, a direction and a distribution of the second electromagnetic field to land the UAV in an orientation and at a precise spot of the designated docking station.

In an exemplary embodiment of the disclosed docking stations, the magnetic device is configured to run an electric current through an electrical conductor for generating the second magnetic field.

In another exemplary embodiment of the disclosed docking stations, the processor is configured to control the landing of the UAV via the second magnetic field.

In another exemplary embodiment of the disclosed docking stations, the processor is configured to emit a position signal and/or to present a visual sign for visual positioning by the UAV.

In another exemplary embodiment of the disclosed docking stations, the second magnetic field is emitted when the UAV enters the adjacency of the designated docking station.

Exemplary embodiments of the disclosed docking stations further comprise one or more magnetic shields configured to protect magnetic sensitive devices associated with the docking station while the second magnetic field is activated.

In another exemplary embodiment of the disclosed docking stations, the protection of magnetic sensitive devices includes deactivating the magnetic sensitive devices and/or shielding the magnetic sensitive devices with the one or more magnetic shields.

In another exemplary embodiment of the disclosed docking stations, the one or more magnetic shields attenuate the first magnetic field and/or the second magnetic field.

In another exemplary embodiment of the disclosed docking stations, the one or more magnetic shields do not attenuate an earth magnetic field.

In another exemplary embodiment of the disclosed docking stations, the magnetic sensitive devices comprise at least one of a High-Definition image transferring device, a compass and an electrical circuit.

In another exemplary embodiment of the disclosed docking stations, the processor is configured to deactivate the second magnetic field when the UAV is landed at the precise spot of the designated docking station.

What is claimed is:

1. A landing system, comprising:
    an unmanned aerial vehicle (UAV) configured to emit a first magnetic field;
    a docking station configured to emit a second magnetic field opposing the first magnetic field, wherein the first magnetic field and the second magnetic field cooperatively generate a magnetic levitation force; and
    a processor configured to:
        receive a landing request from the UAV or a landing command from the docking station, wherein the landing request or the landing command comprises location information used to determine whether the UAV is in an effective range of the docking station;

control the magnetic levitation force to land the UAV onto the docking station when the UAV is within the effective range of the docking station; and initiate a protective measure for protecting one or more magnetic sensitive devices of the UAV when the UAV is within the effective range of the docking station, the protecting measure including activating a first magnetic shield associated with the UAV or a second magnetic shield associated with the docking station to cover the one or more magnetic sensitive devices.

2. The landing system of claim 1, wherein the processor is disposed on the UAV, the docking station, or a remote device.

3. The landing system of claim 1, wherein the first magnetic field is generated by a first magnetic arrangement disposed on the UAV and the second magnetic field is generated by a second magnetic arrangement disposed on the docking station, the first magnetic arrangement or the second magnetic arrangement comprising one or more of a permanent magnet and/or an adjustable magnet including an electromagnet.

4. The landing system of claim 1, wherein:
the landing request is wirelessly transmitted from the UAV;
the landing command is wirelessly transmitted from the docking station; and
the location information includes one or more of global positioning system (GPS) data and visual positioning data, wherein the GPS data representing a location of the UAV and/or the docking station, and the visual positioning data representing a location of a visual sign at the docking station.

5. The landing system of claim 1, wherein the effective range is formed by the second magnet field providing a half sphere boundary, a circular boundary, an elliptical boundary, or a rectangular boundary from the docking station.

6. The landing system of claim 1, wherein the processor is further configured to:
control the magnetic levitation force by adjusting one or more of a frequency, a magnitude, a direction, and a distribution of the first magnetic field or the second magnetic field.

7. The landing system of claim 6, wherein the processor is further configured to:
decrease or increase the frequency and/or the magnitude of the first magnetic field or the second magnetic field; or
change the direction and/or the distribution of the first magnetic field or the second magnetic field.

8. The landing system of claim 7, wherein changing the direction and/or the distribution of the first magnetic field or the second magnetic field includes changing a magnetic pole of the first magnetic field or the second magnetic field.

9. The landing system of claim 1, wherein the protective measure further comprises: shutting down a power of the UAV or shutting down a power of propellers of the UAV.

10. The landing system of claim 1, wherein the first magnetic shield or the second magnetic shield comprises a metallic or magnetic material and is configured to attenuate the first magnetic field or the second magnetic field.

11. The landing system of claim 1, wherein the one or more magnetic sensitive devices comprise an image sensor including a high-definition image transferring sensor, or a position sensor including a GPS sensor or a compass.

12. A landing method comprising:
receiving a landing request from an unmanned aerial vehicle (UAV) or a landing command from a docking station, wherein the landing request or the landing command comprises location information used to determine whether the UAV is in an effective range of the docking station;
determining whether the UAV is within the effective range of the docking station based on the location information;
controlling a magnetic levitation force to land the UAV onto the docking station when the UAV is within the effective range of the docking station, wherein the magnetic levitation force is cooperatively generated by a first magnetic field that is emitted from the UAV and a second magnetic field opposing the first magnet field that is emitted from the docking station; and
initiating a protective measure for protecting one or more magnetic sensitive devices of the UAV when the UAV is within the effective range of the docking station, the protecting measure including activating a first magnetic shield associated with the UAV or a second magnetic shield associated with the docking station to cover the one or more magnetic sensitive devices.

13. The landing method of claim 12, wherein the first magnetic field is generated by a first magnetic arrangement disposed on the UAV and the second magnetic field is generated by a second magnetic arrangement disposed on the docking station, the first magnetic arrangement or the second magnetic arrangement comprising one or more of a permanent magnet and/or an adjustable magnet including an electromagnet.

14. The landing method of claim 12, wherein:
the landing request is wirelessly transmitted from the UAV;
the landing command is wirelessly transmitted from the docking station; and
the location information includes one or more of global positioning system (GPS) data and visual positioning data, wherein the GPS data representing a location of the UAV and/or the docking station, and the visual positioning data representing a location of a visual sign at the docking station.

15. The landing method of claim 12, wherein the effective range is formed by the second magnet field providing a half sphere boundary, a circular boundary, an elliptical boundary, or a rectangular boundary from the docking station.

16. The landing method of claim 12, further comprising:
controlling the magnetic levitation force by adjusting one or more of a frequency, a magnitude, a direction, and a distribution of the first magnetic field or the second magnetic field.

17. The landing method of claim 16, further comprising:
decreasing or increasing the frequency and/or the magnitude of the first magnetic field or the second magnetic field; or
changing the direction and/or the distribution of the first magnetic field or the second magnetic field.

18. The landing method of claim 17, wherein changing the direction and/or the distribution of the first magnetic field or the second magnetic field includes changing a magnetic pole of the first magnetic field or the second magnetic field.

19. The landing method of claim 12, wherein the protective measure further comprises: deactivating the one or more magnetic sensitive devices, shutting down a power of the UAV, or shutting down a power of propellers of the UAV.

20. The landing method of claim 12, wherein the first magnetic shield or the second magnetic shield comprises a metallic or magnetic material and is configured to attenuate the first magnetic field or the second magnetic field.

21. The landing system of claim 1, wherein the protective measure further comprises: deactivating the one or more magnetic sensitive devices.

\* \* \* \* \*